Sept. 7, 1937.  R. J. KEHL  2,092,579
OXYGEN AIR ACETYLENE INJECTOR AND MIXER FOR WELDING BLOWPIPES
Filed June 16, 1934
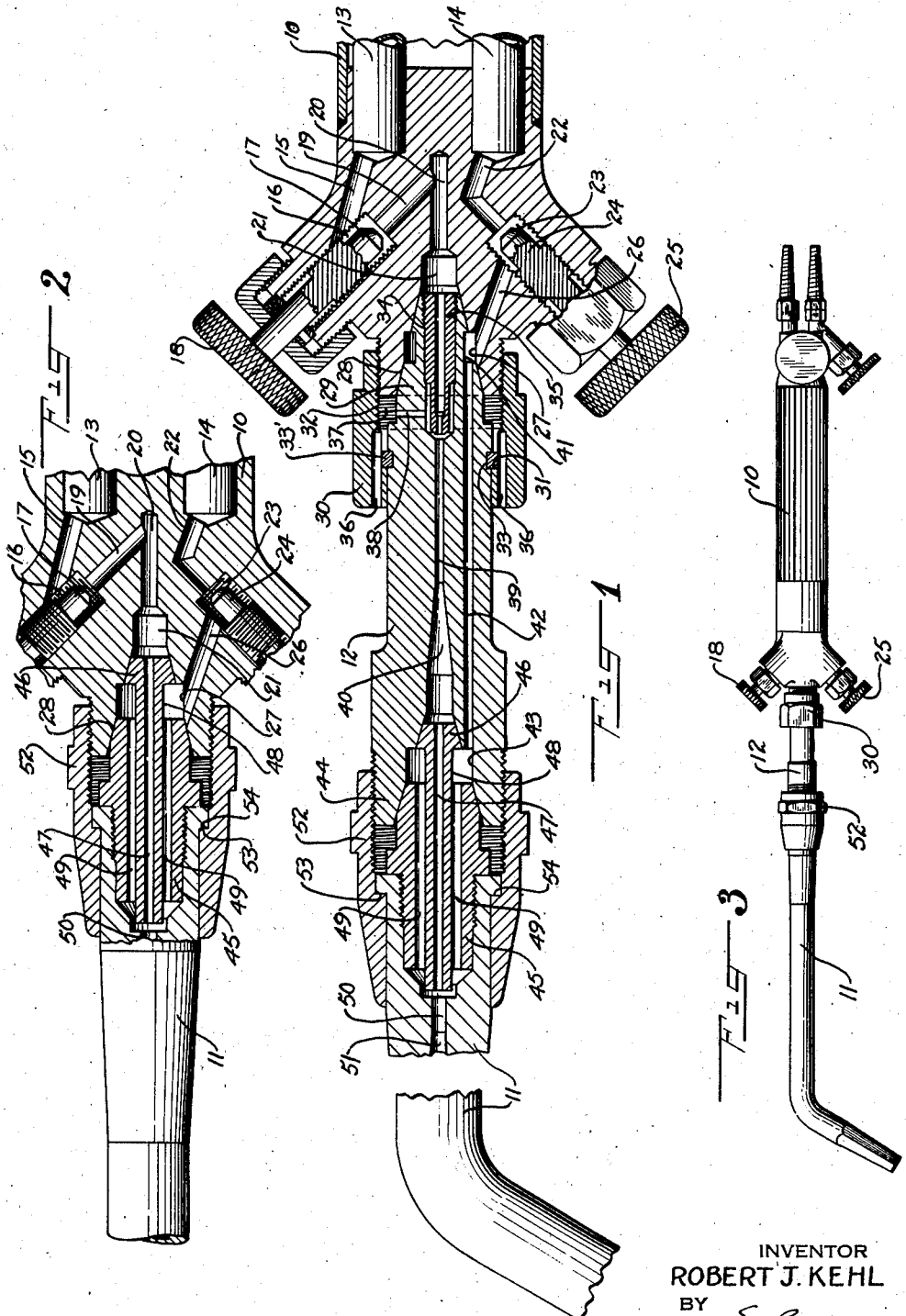
INVENTOR
ROBERT J. KEHL
BY
ATTORNEY Patented Sept. 7, 1937

2,092,579

UNITED STATES PATENT OFFICE 2,092,579

OXYGEN-AIR ACETYLENE INJECTOR AND MIXER FOR WELDING BLOWPIPES

Robert J. Kehl, Bayside, N. Y., assignor, by mesne assignments, to Union Carbide and Carbon Corporation, a corporation of New York Application June 16, 1934, Serial No. 730,904

15 Claims. (Cl. 158—27.4)

This invention relates to blowpipes and especially to the construction of a blowpipe which may be readily changed from an oxy-fuel gas blowpipe to an oxygen-air-fuel gas blowpipe by inserting, at a suitable place in the blowpipe, an adaptor. The blowpipe may be used for welding, heat treating, deseaming, cutting, or other similar purposes in the well-known manner. Such blowpipes are ordinarily designed to use oxygen of a high purity as a combustion supporting gas, but may use oxygen of a lower purity. Throughout the following specification the term oxygen is to be used as referring to any atmosphere substantially richer in oxygen than ordinary air. Similarly, it has been found that acetylene is the most suitable fuel for such blowpipes. However, numerous other gases are also suitable for use as fuels, such, for example, as hydrogen, blast furnace gas, commercial illuminating gas, and the like.

An object of this invention is to make possible the rapid conversion from an ordinary blowpipe to one in which air is mixed with the oxygen, or the fuel, or both to reduce the consumption of oxygen and/or fuel gas and thereby perform in an economical manner the operations, such as welding or cutting, for which blowpipes are ordinarily used. A further object of the invention is to devise a blowpipe construction whereby an ordinary blowpipe may be converted into an oxygen-air-acetylene blowpipe by inserting in any suitable place, as between the handle and the stem, an adaptor provided with an air inlet, an oxygen inlet and a fuel gas inlet and also means for mixing the incoming air with one of the two last mentioned gases. A still further object of the invention is to devise an apparatus of the type described which will be simple in construction, rugged, capable of easy operation in use, and which will be in a form which will enable it to be quickly and easily assembled and taken apart. Other objects of the invention will in part be evident and will in part appear in the accompanying specification.

A blowpipe illustrating one embodiment of my invention is shown in the accompanying drawing in which:

Fig. 1 is a cross section of a portion of a blowpipe illustrating one embodiment of my invention including the adaptor for use in mixing air with one of the gases;

Fig. 2 is a similar cross-section of a portion of a blowpipe assembled for use without the admixed air; and, Fig. 3 is a view of the complete blowpipe including the adaptor.

The blowpipe illustrated in the drawing comprises a body or handle portion 10, a stem or nozzle section 11 and an adaptor 12 which may be inserted between the body portion and the stem section. It is to be noted that one end of the stem section is of substantially the same shape as one end of the adaptor and that one end of the handle portion is of the same shape as the other end of the adaptor. Also that the end of the stem section is complementary to the end of the handle section. Thus, the stem section may either engage the handle portion or may engage one end of the adaptor in which case the other end of the adaptor engages the handle portion.

The body 10 has a fluid conduit 13 extending longitudinally thereof and a parallel fluid conduit 14 therein, which conduits will be referred to for convenience as an "oxygen conduit" and an "acetylene conduit" respectively. Obviously, other gases could flow through the conduits 13 and 14.

The oxygen conduit 13 discharges through a duct 15 into a valve chamber 16 in the front of the body 10, and a valve 17 operated by a knurled head 18 controls the passage of oxygen from the valve chamber 16 through ducts 19 and 20 into an oxygen chamber 21.

The acetylene conduit 14 discharges through a duct 22 into a valve chamber 23, in which a valve 24 operated by a knurled head 25 controls the flow of acetylene. A duct 26 leads from the acetylene valve chamber 23 to an annular groove 27 in a conical recess 28 in the forward part of the body 10.

The adaptor 12 has a convex conically shaped rear end 29 adapted to fit snugly into the conical concave recess 28 in the forward end of the body 10; and an internally threaded union 30, having an internal shoulder 31 thereon, is screwed upon external threads 32 on the forward end of the body 10 to hold the adaptor 12 in position with respect to the body. An annular groove 33 and a split ring 33' therein provide a bearing on the adaptor against which the internal shoulder 31 of the union 30 may press.

The adaptor or nipple 12 has a substantially axial passage therethrough including a bore 34 in its rear end immediately forward of the oxygen chamber 21 in the body 10. An injector nozzle 35 is disposed in the bore 34, this nozzle with the other parts of the adaptor constituting an injector in which the oxygen acts to draw air into the axial passage. Thus, the bore 34, the injector nozzle 35 therein and a mixing throat 39 (which will be described more in detail below), together constitute a mixer in the rear end of the nipple 12. The nozzle may be held in the bore 34 by being screwed into an interior threaded section thereof. The union 30 has passages 36 therein, open to atmosphere at the end of the union farthest from the body 10, for supplying air to the injector. Air passing through the passages 36 enters an annular space 37 between the union and the nipple, and a duct 38 carries air from the annular space 37 to the forward end of the bore 34, whence it is aspirated by oxygen passing through the injector nozzle 35.

The substantially axial passage through the nipple 12 includes a mixer throat 39 which is a continuation of the bore 34 and extends forwardly thereof. Beyond the mixer throat 39 an expansion chamber 40 is formed in the nipple. An annular groove 41 in the convex conical rear end of the nipple registers with the annular groove 27 in the concave recess in the forward part of the body 10, the two grooves together forming an annular chamber into which acetylene is carried by the duct 26. A longitudinal passage 42 extends through the nipple in a direction generally parallel to the substantially axial passage therethrough and terminates in an annular groove 43 in a recessed forward end 44 of the nipple 12.

A second mixer 45, having a convex conically shaped rear end 46 adapted to fit into the recessed forward end of the nipple 12, has a central passage 47 therethrough in continuation of the central passage and mixer throat of the nipple. An annular groove 48 in the rear end 46 of the second mixer 45 registers with the annular groove 43 in the recessed forward end of the nipple 12 thereby forming an annular acetylene chamber in communication with the longitudinal passage 42 through the nipple. A plurality of passages 49 extend through the mixer 45 from the annular groove 48 to the forward end thereof, thereby serving to carry acetylene to a position adjacent the exit end of the central passage 47, whence it may be aspirated into the stem 11 of the blowpipe by the oxygen-air mixture issuing at greater pressure from the end of the central passage 47. The stem 11 has a mixer throat 50 therein immediately in front of the forward end of the central passage 47 into which the oxygen-air mixture carries the acetylene and mixes therewith. An expansion chamber 51 is provided at the forward end of the mixing chamber 50, but otherwise the stem 11 is of ordinary construction. The mixer 45 is illustrated as being screwed into the end of the stem 11, and its rear end as being maintained in the forward recess 44 of the nipple 12 by pressure exerted thereon. Clearly the invention is not limited to screwing the mixer into one of these elements instead of the other.

A union 52, having an internal shoulder 53 thereon, is screwed upon the externally threaded forward end of the nipple, the shoulder 53 engaging with a corresponding shoulder 54 upon the rear end of the stem 11. Thus, the union 52 is adapted to be screwed upon the nipple to draw the nipple and the stem together and to press the rear end of the mixer into the recessed forward end of the nipple.

From the description which has been given the operation of the apparatus will be obvious. Oxygen coming to the blowpipe and passing through the oxygen conduit 13 is carried to the injector 35 under control of the valve 17. The injector picks up air, which is mixed with the oxygen passing through the mixing throat 39 in the nipple 12 and into the expansion chamber 40. From the expansion chamber 40 the oxygen-air mixture enters the central passage 47 of the mixer 45 and is projected into the mixing throat 50 in the stem 11. At the same time, acetylene under less pressure passes through the acetylene conduit 14, and, controlled by the acetylene valve 24, enters the annular chamber formed by the grooves 27 and 41 in the body and nipple respectively, continues through the longitudinal passage 42 in the nipple to the annular chamber formed by the annular grooves 43 and 48 in the nipple and the mixer 45 respectively, continues through the longitudinal passages 49 to the forward end of the mixer where it is aspirated by the air-oxygen mixture into the mixing throat 50 and thence through the blowpipe stem.

In case it is desired to use the blowpipe without admixed air the stem section is connected directly to the body section without the interposition of the adaptor or nipple portion. In this case oxygen from the chamber 21 is delivered directly to the bore 47 of the second mixer 45. Also acetylene from the bore 26 is delivered directly to the annular recess 43, which in this case is formed by the registry of the conical concave portion of the body member and the conical convex portion of the mixer 45.

Clearly the apparatus may be quickly assembled and taken apart. Differently constructed injector nozzles may be employed to meet different conditions, it being merely necessary to substitute one such nozzle for another. Similarly, different mixer units having like external dimensions but different sizes or numbers of interior passages therein may be substituted to change the characteristics of the flame or the fluid consumption.

It will also be recognized that the danger of flash backs is minimized by the construction just described. So long as any oxygen or acetylene pressure is available the flame will be smothered in the long passages in the nipple before entering the oxygen or acetylene conduits; and if a flash back through the air passages should occur the flame will be projected away from the operator with corresponding safety in employing the apparatus. Furthermore, the use of the nipple and associated parts between the body and the stem of the blowpipe results in a more effective mixture, under control, than would be attained without the addition of the adaptor. Economy of fuel and oxygen, or a correspondingly hotter and more intense flame may thus be produced at the burner tip.

Manifestly the supply of fuel fluid and combustion supporting fluid may be transposed in the apparatus. For example, in the construction illustrated and described the acetylene may pass centrally through the nipple being supplied under greater pressure than the oxygen, aspirating and mixing with air at the rear end of the nipple, and, together with the added air, aspirating and mixing with the oxygen upon entering the stem.

Clearly the invention is not limited to use with oxygen, acetylene and air, nor even to a combustible and a combustion supporting fluid. The invention may be applied in many other instances where fluids are to be mixed and projected through a nozzle. Furthermore, the invention is not limited to the precise construction and arrangement of parts here illustrated and described by way of example.

I claim:

1. An adaptor for insertion between the body portion and stem portion of a blowpipe comprising a nipple having a passage therethrough, said passage including a mixer throat; and an injector nozzle in said nipple and communicating with the passage therein; said nipple being provided with a duct opening on the outside of said nipple and communicating with the passage in said nipple adjacent the discharge end of said injector nozzle, and a second passage extending through said nipple, said passages being adapted to carry different gases to a mixing point in the forward part of the blowpipe.

2. An adaptor for insertion between the body portion and the stem portion of a blowpipe comprising a nipple having a substantially axial passage therethrough and a second passage therethrough, one of said passages including a mixer throat, said passages being adapted to carry different gases to a mixing point in the forward part of the blowpipe; an injector nozzle at the rear end of said nipple and communicating with the passage including the mixer throat; said nipple being provided with a duct extending to the outside of said nipple and communicating with the passage in said nipple adjacent the discharge end of said injector nozzle.

3. In an adaptor for insertion between the body portion and the stem portion of a blowpipe, a nipple having a substantially axial passage therethrough, including a mixer throat; an injector nozzle in the rear end of said nipple in the continuation of said passage; said nipple being provided with a duct extending from the outside of said nipple and communicating with the continuation of the passage in said nipple adjacent said injector nozzle, and a second passage extending through said nipple, said passages being adapted to carry different gases to a mixing point in the forward part of the blowpipe; and a union for attaching said nipple to the body portion of said blowpipe, said union having passages therein communicating with the ports at the outside of said nipple.

4. A blowpipe comprising a body portion, a stem portion, and an adaptor portion, the adaptor portion comprising a nipple having a substantially axial passage therethrough, said passage including a mixer throat; an oxygen-air injector in the rear end of said nipple in continuation of the passage therethrough; and an oxygen-air-fuel gas mixer in the stem portion communicating with the mixer throat.

5. A blowpipe comprising a body portion, a stem portion, and an adaptor portion; said adaptor portion comprising a nipple having a substantially axial passage therethrough including a mixer throat; an oxygen-air injector in the rear end of said nipple in continuation of the passage therein, and a union for attaching said nipple to the body portion, said union having passages therein open to the atmosphere for carrying air to said oxygen-air injector; said stem portion including an oxygen-air-fuel gas mixer communicating with said mixer throat.

6. A blowpipe comprising a body portion, a stem portion and an adaptor member between the body portion and the stem portion; said adaptor member comprising a nipple having a passage therethrough including a mixer throat, and an oxygen-air injector in the rear end of said nipple in continuation of the passage therein, said nipple being provided with a fuel-gas passage; said stem portion being provided with a fuel-gas-air-oxygen mixer communicating with the passages in said nipple.

7. A blowpipe comprising a nipple having a substantially axial passage therethrough, said passage including a mixer throat; an oxygen-air injector in the rear end of said nipple in continuation of the passage therein; a fuel gas-air-oxygen mixer forwardly of said nipple communicating with the passage therein; and a union having passages therein open to the atmosphere for carrying air to said oxygen-air injector.

8. A blowpipe comprising a body portion, a stem portion, and an adaptor member, arranged between the body portion, and the stem portion; said adaptor member comprising a nipple having a substantially axial passage therethrough including a mixer throat; an oxygen-air injector in the rear end of said nipple in the passage therein; said nipple being provided with external threads at the forward end thereof; said stem portion being provided with an oxygen-air-fuel gas mixer communicating with the passage in said nipple, and having a shoulder thereon; and a union engaging the shoulder on said stem portion having internal threads for engaging the external threads on said nipple.

9. In an adaptor for insertion between the body portion and stem portion of a blowpipe, a nipple having a recessed forward end, a substantially axial passage therethrough including a mixer throat terminating in said recess, an annular groove in said recess, a second passage through said nipple terminating in said annular groove, said passages being adapted to carry different gases to a mixing point in the forward part of the blowpipe, and an injector in the rear end of said nipple communicating with said axial passage.

10. A blowpipe comprising an adaptor having a recessed forward end, said adaptor having a substantially axial passage therethrough including a mixer throat terminating in the recess in the forward end, an annular groove in said recess, said adaptor being provided with a second passage therethrough terminating in said annular groove; a mixer having its rear end shaped to fit into the recessed forward end of said adaptor, said mixer having a central passage therethrough in continuation of the mixer throat of said adaptor, an annular groove in the rear end of said mixer adapted to register with the annular groove in said adaptor to form an annular chamber, a second passage extending from the annular groove to the forward end of said mixer, said adaptor being provided with external threads at the forward end thereof; a stem portion surrounding said mixer and having a shoulder thereon, and a union engaging said shoulder and the threads on the forward end of said adaptor.

11. In a blowpipe, the combination of a handle member having oxygen and fuel gas ducts extending therethrough; a nozzle carrying member having a mixture passage; and means connecting said handle to said nozzle carrying member, such connecting means having an oxygen passage and a fuel gas passage communicating with the oxygen and fuel gas ducts in said handle member, an air inlet open to the atmosphere and communicating with one of the passages in said connecting means, means for mixing the incoming air with the gas in the passage to which said air is delivered including an injector, and means for delivering said air-gas mixture and the other gas from said connecting means and for mixing such mixture and other gas as they are delivered to the passage in said nozzle-carrying member.

12. In a blowpipe, the combination of a handle member, an adaptor member, and a mixer, each of said members being provided with separate passages for two gases, one end of said adaptor member being complementary to and adapted to register with one end of said handle member; the other end of said adaptor member being identical in shape with said end of the handle member and one end of said mixer being identical in shape with said first mentioned end of the adaptor member whereby it will register with the end of said handle member; said adaptor member being provided with an injecting and mixing nozzle in one passage therein and ports in communication with atmosphere and the passage adjacent said injecting and mixing nozzle whereby air may be mixed with the gases in the passage therein containing said injecting and mixing nozzle.

13. In an adaptor for insertion between the body and stem of a blowpipe, a nipple having a recessed forward end, a convex conically shaped rear end, a bore in the rear end for reception of an injector nozzle, a duct leading through said nipple from atmosphere into the bore adjacent said injector nozzle at an angle thereto, a substantially axial passage through said nipple from the bore to the recess in the forward end, and a second passage therethrough from the conically shaped rear end thereof outside the bore to the recess in the forward end, said passages being adapted to carry different gases to a mixing point in the forward part of the blowpipe.

14. A convertible blowpipe adapted to deliver either a mixture of fuel gas and oxygen or a mixture of fuel gas, oxygen and air, said blowpipe comprising a mixer having inlets, a conduit adapted to supply fuel gas to one inlet of said mixer, a conduit adapted to supply oxygen to another inlet of said mixer, and a nozzle having a passage communicating with the outlet of said mixer and adapted to deliver the resulting mixture of fuel gas and oxygen; and an attachment constructed and adapted to be coupled to said blowpipe to convert the latter into a blowpipe adapted to supply to said nozzle a mixture of fuel gas, oxygen and air, said attachment comprising an air inlet, a mixer adapted to communicate both with said air inlet and with one of said conduits, and a passage adapted to communicate with the other of said conduits; said passage and the outlet of the last-named mixer being adapted to severally communicate with the respective inlets of the first-named mixer when said attachment is coupled to said blowpipe.

15. A blowpipe of the class described comprising a support provided with separate passages for separate gases; a device having an end portion complementary to the end of said support, adapted to co-operate therewith and provided with separate passages in respective communication with said first passages for conducting the gases to a mixing throat; means provided with end portions respectively complementary with the mentioned end portions of the support and the device, including additional gas introducing means and mixing means for mixing said additional gas with one of said gases prior to its reaching said mixing throat.

ROBERT J. KEHL.